Patented Jan. 1, 1929.

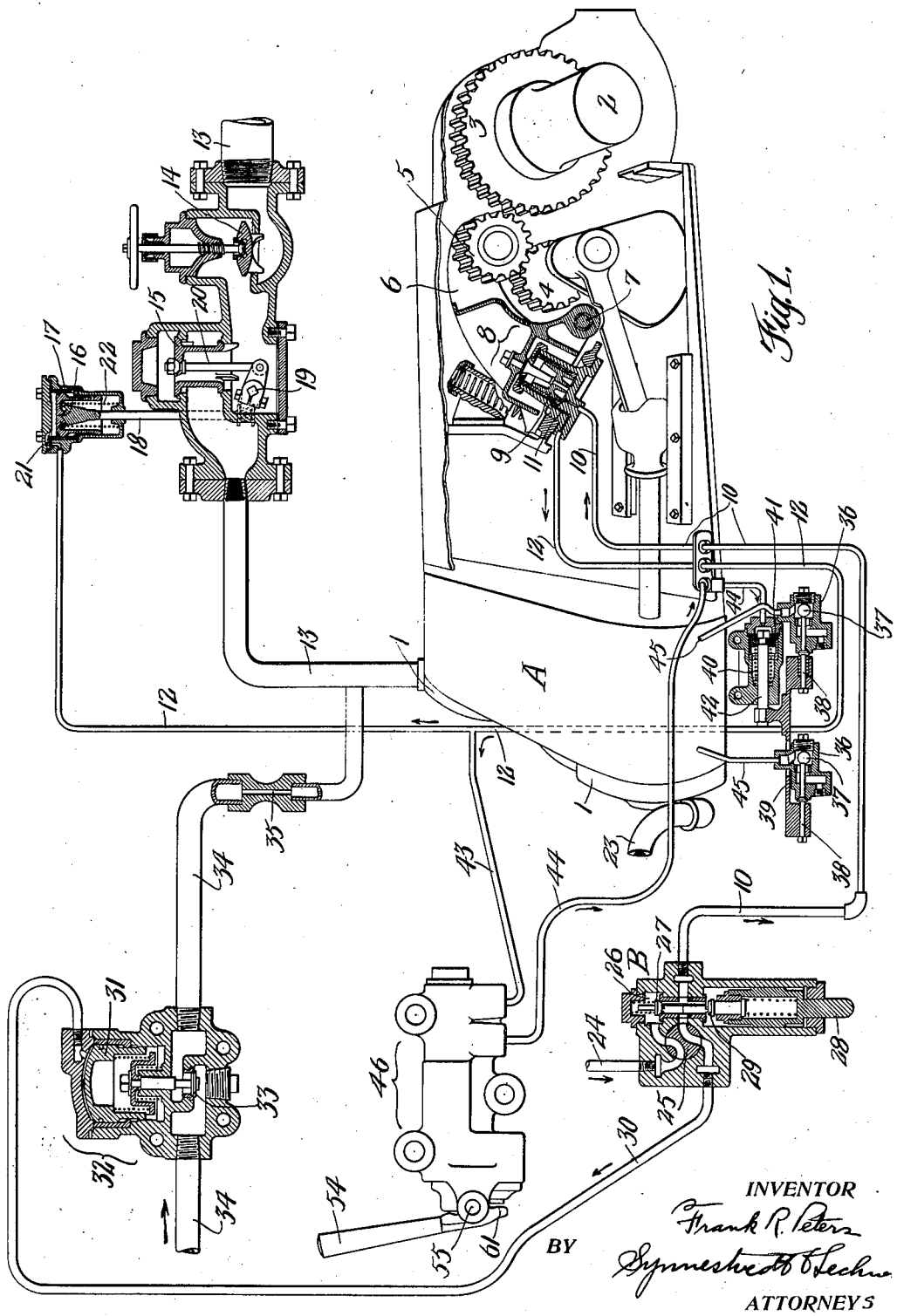

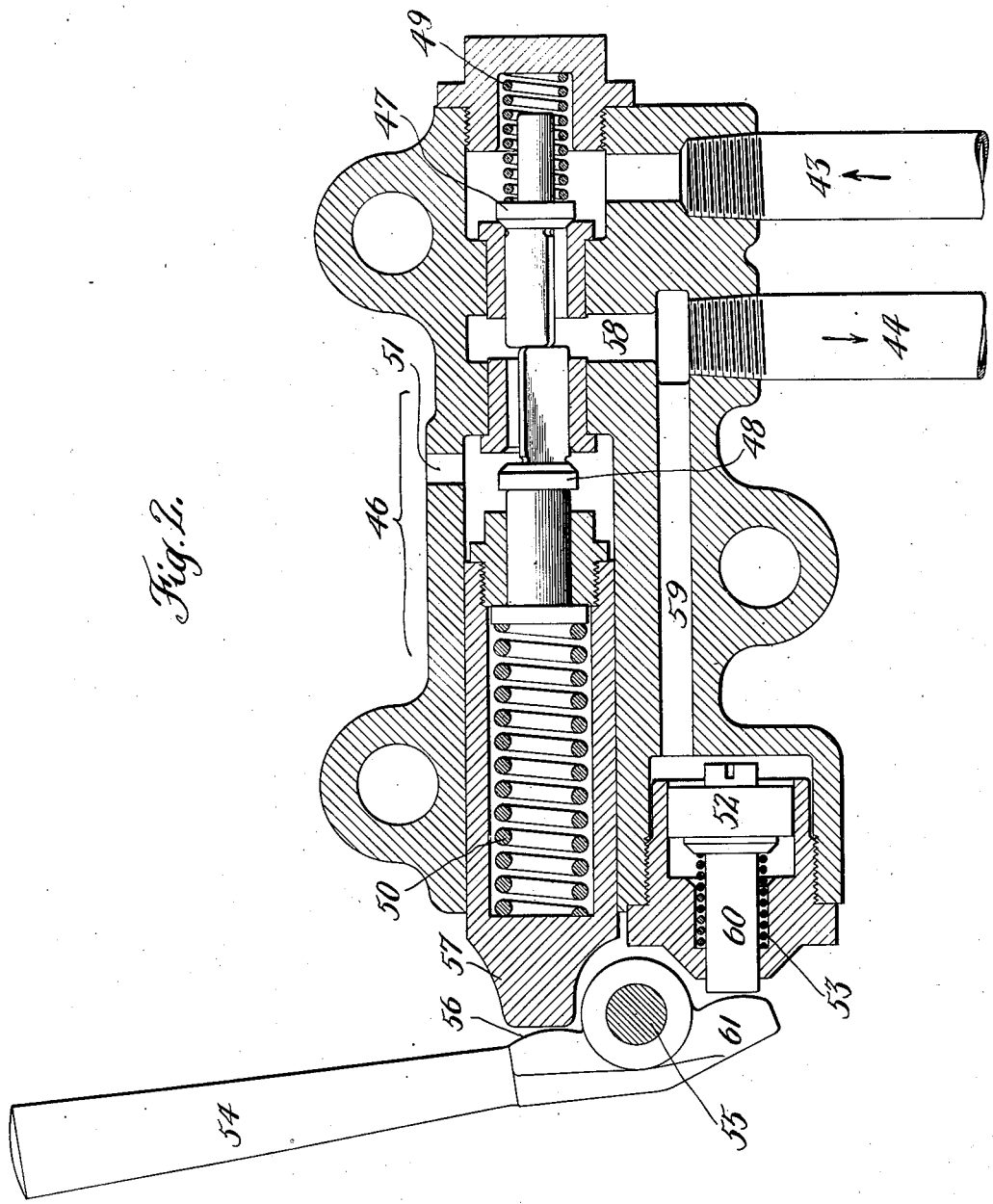

1,697,691

UNITED STATES PATENT OFFICE.

FRANK RICHARD PETERS, OF NEW YORK, N. Y., ASSIGNOR TO FRANKLIN RAILWAY SUPPLY COMPANY, OF NEW YORK, N. Y., A CORPORATION OF DELAWARE.

LOCOMOTIVE-BOOSTER APPARATUS.

Application filed May 7, 1926. Serial No. 107,357.

This invention relates to locomotive booster apparatus for aiding the locomotive in starting or at comparatively slow speeds on heavy pulls. Such apparatus has now become well known in the art but for the sake of a clear understanding of the following invention it is desired to state that such apparatus is normally designed to be inoperative. That is to say when the power of the booster is not desired the supply of steam is cut off and it is disentrained from the axle which it drives.

Boosters of this type have commonly been applied to the axle of a locomotive trailer truck but it is to be understood, of course, that they could be applied to any axle either on the locomotive or on the tender or on any car as may be desired.

As is also well known in the art it has been desirable in practice to provide some means for idling the booster engine before putting it into operation as a driving factor. It has also been important to provide means for clearing the booster cylinders of any condensation, an accumulation of which is liable to be rather pronounced because of the necessarily exposed location of the booster, length of steam supply pipes, etc.

More specifically considered, therefore, my invention relates to an improved means for disposing of the condensate which accumulates in the booster cylinders and it has for its objects the provision of booster cylinder cocks which will open and remain open as long as the booster is disentrained or during an idling operation and furthermore to remain open after the booster has been put into operation until closed by the engineer. After such closure it is the object of my invention to provide means whereby the cocks will remain closed without any further attention on the part of the engineer. A still further object is to provide means whereby the cylinder cocks can be opened at the will of the engineer during booster operation such means being so arranged that they will stay open until again deliberately closed.

It is also an object of my invention to greatly simplify booster controlling apparatus while at the same time providing for the above important improvements or objects. To this end it is an object of the invention to provide means for controlling the cylinder cocks from the fluid pressure controlling system now almost universally used in booster motor equipment.

How all of the foregoing objects and advantages are obtained will now be described in connection with the accompanying drawings, which illustrate the invention in preferred form and in which Fig. 1 is a diagrammatic showing of all of the principal parts entering into my improved booster equipment with certain of them in elevation, others in section and the booster motor illustrated roughly in perspective.

Fig. 2 is a longitudinal section thru an improved valve used in connection with my invention.

Referring particularly to Fig. 1 it will be seen that the booster motor A is of the usual type having a pair of cylinders 1 adapted to drive the axle 2 which may be any desired axle as above stated. The axle 2 carries a gear 3 which can be connected to the pinion 4 on the booster crank shaft thru the medium of the idler gear 5 carried upon the rocking member 6. The gear 5 is always in mesh with the driving pinion 4 and when moved to the right upon the pivot 7 this gear 5 can be brought into mesh with the axle gear 3 in order to complete entrainment, as it is termed in the art. The rocking member 6 can be operated by any suitable motor entrainment mechanism which I have designated as a whole by the character 8 but the details of which it is not necessary to describe since they form in themselves no part of the present invention. It is only necessary to know that when fluid pressure, preferably air, is admitted to the face of the piston 9 thru the pipe 10, it will act to throw the rocking member 6 to the right as already described and when the piston 9 has completed its stroke the conduit or channel 11 will be brought into communication with the supply of air thru the pipe 10 so that the fluid pressure can pass out thru the pipe 12 which communicates with the channel 11.

The booster steam supply comes in thru the conduit 13 which latter can be connected to the locomotive steam chest (not shown). In the pipe 13 are located a manually operated shut off valve 14 and a regular throttle valve 15. The former, of course, is normally in open position and is used only upon special occasions as, for instance, when making repairs. The throttle valve 15 is ordinarily depended upon to control the supply of steam thru the booster motor cylinders 1.

This throttle valve is opened by means of a small motor device comprising essentially a piston 16 adapted to move in a cylinder 17. The piston is connected thru the medium of the rod 18 and suitable leverage mechanism 19 to the stem 20 of the throttle valve 15. When fluid pressure enters the cylinder 17 thru the pipe 12 and channel 21 the piston 16 is forced downwardly against the pressure of the spring 22 thereby opening the throttle valve 15 as just mentioned. Steam will then flow thru the pipe 13 to the booster cylinders and will exhaust thru the pipe 23 which latter can be connected in any suitable or desired manner to some point at which the exhaust steam is disposed of.

From the description so far given it will be apparent that I prefer to provide the booster with a fluid pressure actuated controlling system, namely, the air pressure here disclosed and this system will now be completely described although other systems of control might be used.

To begin with the air pressure from any suitable source of supply such as the air brake reservoir (not shown) enters the system thru the pipe 24 and is immediately subject to the control of the pilot valve indicated as a whole by the reference character B.

If the rotary valve 25 is in the position indicated in Fig. 1 the air pressure will reach the chamber 26 in which chamber it is blocked by the valve 27. It is only when the plunger 28 is moved inwardly that any air can flow from the chamber 26 past the valve 27 into the pipe 10. The plunger 28 can be under the control of the reverse lever of the locomotive so that when the reverse lever is moved into the corner it will force the plunger 28 upwardly or inwardly in order to close the valve 29 and open the valve 27, the valve 29 being simply for the purpose of closing a communication to exhaust. The principle of this arrangement is quite well known in the booster art at the present time and therefore it need not be particularly elaborated upon. At the same time that air is being delivered to the pipe 10 it can flow outwardly thru the other passage in the rotary valve 25 into the pipe 30 which communicates with the piston 31 of the fluid motor device 32 for controlling a supply of steam for the purpose of idling the booster motor in order to insure easy meshing of the gear during entrainment.

If it is desired to idle the booster motor before bringing it into driving operation the rotary valve 25 is turned so that communication is established between the pipe 24 and the pipe 30 directly. This at the same time will cut off any supply of air to the balance of the controlling system thru the pipe 10. As long as the air pressure is introduced thru the pipe 30 in the manner just described the preliminary throttle valve 33 will be held downward or in its open position by virtue of the fact that piston 33 will be depressed. Steam from any suitable source of supply on the locomotive not subject to the control of the main locomotive throttle will then flow to the booster steam supply pipe 13 thru the conduit 34 in which can be located a suitable restriction 35 so that there will be just enough steam to idle the booster motor without causing it to unduly race.

The booster cylinders 1 are provided with cylinder cocks 36 the ball valves 37 of which are normally held away from their seats by means of the plunger rods 38 which are coupled to the operating spider 39 normally subject to the pressure of the spring 40 thru the medium of the piston 41 and rod 42. The spring 40 acting against the piston 41 forces it to the right and moves with it the member 39 which in turn actuates the rods 38 to hold the balls 37 away from their seats. In this way the cylinder cocks are always normally in open position. Whenever the booster is thrown into operation or begins to function, therefore, the cylinder cocks will always be found in open position so that any water of condensation may be driven out. In this way there is no danger of blowing out the cylinder heads of the booster. They will furthermore remain in open position until such time as the engineer wishes them to close. When this time comes, by means of a special valve now to be described, he introduces fluid pressure from the controlling system for the booster thru the pipes 43 and 44 into the cylinder in which the piston 41 operates.

It is desired to point out at this time that the showing of the cylinder cocks is somewhat diagrammatic in order to clearly illustrate their working parts. They are shown as being connected to the ends of the cylinders of the booster by means of the pipes 45. The cylinder cocks for only one of the cylinders are illustrated, it being understood of course that similar cocks are applied to each booster cylinder.

The control valve 46 for the cylinder cocks comprises the opposed valves 47 and 48 (see Fig. 2), the springs 49 and 50 which tend to force the valves 47 and 48 to the left thereby closing valve 47 and opening valve 48 to exhaust 51, and the holding piston 52 normally held in its retracted or inoperative position by means of the spring 53. The lever 54 is pivoted at 55 and when the engineer moves the handle to the right (as the valve is illustrated in these figures) he brings the curved abutting portion 56 into engagement with the plunger 57. By depressing the plunger 57 the valve 48 is closed and the valve 47 is opened as previously described and air will then flow in from the pipe 43 thru the chamber 58 and out thru the pipe 44 to the fluid actuated piston 41 for disabling the means which holds the valves in open position. At the same time the air will reach the piston 52 thru the channel 59 so that the plunger 60 will be forced outwardly against the overhanging lip 61 of the lever 54. In this way the lever 54 is held against the plunger 57 so that when the engineer removes his hand the parts will remain in the positions just described and the cylinder cocks will close and remain closed as long as desired or as long as there may be fluid pressure entering thru the pipe 43.

After the cocks have been closed and the booster is in operation should the engineer for any reason desire to open the cocks he can easily do so by again grasping the handle 54 and moving it in the reverse direction in order to force the plunger 60 back to its right hand position and permit the springs and the fluid pressure to seat the valve 47 and open the valve 48. When this occurs no pressure can reach the piston 41 thru the conduit 44 and whatever pressure was trapped can exhaust thru the chamber 58 and exhaust passage 51.

It will thus be seen that I have provided a very simple and efficient method for controlling a locomotive booster motor equipped with cylinder cocks of the character described. A cylinder cock will always be in open position and remain in open position as long as no fluid pressure is applied to the disabling means 41. Furthermore with my arrangement the cocks will remain in open position even after the booster is entrained and ready to operate as a driving factor until such time as the engineer positively desires to close them. When once closed they will remain in closed position without further attention on the part of the engineer and at all times the engineer is able to open them whenever desired. To all those skilled in the art the foregoing invention will be seen to present many advantages particularly in view of the fact that it eliminates the use of a dome pilot valve, a check valve, a timing reservoir and a three-way cock heretofore in use in equipments of this general type.

I claim:—

1. The combination of a railway vehicle axle, a normally inoperative steam booster motor adapted to drive said axle, a fluid pressure actuated controlling system for causing operation of said booster, a booster cylinder cock, means normally holding said cock in open position, fluid actuated means for disabling said holding means whereby to permit cylinder cock closure, and a manually actuated valve and connections for supplying said disabling means with fluid pressure from said controlling system, said valve being constructed and arranged so that the cylinder cock will always be open upon a discontinuance and subsequent reapplication of the booster driving power regardless of the position in which said valve may have been left by the operator.

2. The combination of a railway vehicle axle, a normally inoperative steam booster motor adapted to drive said axle, a fluid pressure actuated controlling system for causing operation of said booster, a booster cylinder cock, means normally holding said cock in open position, fluid actuated means for disabling said holding means whereby to permit cylinder cock closure, a conduit for supplying said disabling means with fluid pressure from said controlling system, a valve for controlling the flow through said conduit, manual means for opening said valve, fluid actuated means for holding said valve opening means in its open position, and a conduit for supplying said last mentioned fluid actuated holding means with fluid pressure from the supply conduit for said disabling means.

3. The combination of a railway vehicle axle, a normally inoperative steam booster motor adapted to drive said axle, a fluid pressure actuated controlling system for causing operation of said booster, a booster cylinder cock, means normally holding said cock in open position, fluid actuated means for disabling said holding means whereby to permit cylinder cock closure, a conduit for supplying said disabling means with fluid pressure from said controlling system, a normally closed valve for controlling the flow through said conduit, a lever for manually forcing said valve to open position, and means actuated by fluid pressure from said conduit for holding said lever in its open position, said valve and said lever being adapted to return to closed position when the booster becomes inoperative through release of pressure in said booster controlling system.

4. The combination of a railway vehicle axle, a normally inoperative steam booster motor adapted to drive said axle, a fluid pressure actuated controlling system for causing operation of said booster, a booster cylinder cock, means normally holding said cock in open position, fluid actuated means for disabling said holding means whereby to permit cylinder cock closure, a conduit for supplying said disabling means with fluid pressure from said controlling system, a normally closed valve for controlling the flow through said conduit, means for manually forcing said valve to open position, and a second means actuated by fluid pressure from said conduit for holding said opening means in its open position, said valve and said opening means being adapted to return to closed position when the booster becomes inoperative through release of pressure in said booster controlling system.

5. The combination of a railway vehicle axle, a normally inoperative steam booster motor adapted to drive said axle, a fluid pressure actuated controlling system for causing operation of said booster, a booster cylinder cock, means normally holding said cock in open position, fluid actuated means for disabling said holding means whereby to permit cylinder cock closure, a conduit for supplying said disabling means with fluid pressure from said controlling system, and a manually actuated valve device for controlling the flow through said conduit, said valve device being constructed to be held in open position by the fluid pressure which it controls and to close upon release of such pressure through the booster controlling system while at the same time permitting manual opening or closing at any time during operation of the booster.

6. The combination of a railway vehicle axle, a normally inoperative steam booster motor adapted to drive said axle, a booster cylinder cock, means normally holding said cock in open position, fluid actuated means for disabling said holding means, and a manually actuated valve together with supply connections for supplying said disabling means with fluid pressure, said valve being constructed and arranged so that the cylinder cock will always be open upon a discontinuance and subsequent reapplication of the booster driving power regardless of the position in which said valve may have been left by the operator.

7. The combination of a railway vehicle axle, a normally inoperative steam booster motor adapted to drive said axle, a booster cylinder cock, means normally holding said cock in open position, fluid actuated means for disabling said holding means, means for supplying said disabling means with fluid pressure, and a manually actuated valve device for controlling the supply of fluid pressure, said valve device being constructed to be held in open position by the fluid pressure which it controls.

8. The combination of a railway vehicle axle, a booster motor adapted to drive said axle, means for supplying steam to said booster motor to operate the same, a booster cylinder cock, means normally holding said cock in open position, fluid actuated means for disabling said holding means, means for supplying said disabling means with fluid pressure, and a manually actuated valve device for controlling the supply of said fluid pressure when the booster is being supplied with steam, said valve device being constructed to be held in open position by the fluid pressure which it controls and to close automatically in the absence of said fluid pressure.

9. The combination of a locomotive booster motor, means for supplying it with steam, a booster cylinder cock, means normally holding said cock in open position, fluid actuated means for disabling said holding means, means for supplying said disabling means with fluid pressure effective when the booster is being supplied with steam, and a manually actuated valve device for controlling the supply of said fluid pressure, said valve device being constructed to be held in open position by the fluid pressure which it controls and to close automatically in the absence of said pressure.

10. In a locomotive booster apparatus where the booster is provided with a cylinder cock which is normally held in open position, the combination of fluid actuated means for disabling said holding means, and a valve device effective when the booster is receiving steam for controlling the supply of fluid pressure to said disabling means, said valve device including a manually actuated member for opening the valve, a member actuated by the pressure entering thru said opened valve for maintaining said manually actuated member in valve opening position, and means for returning the valve, the manual actuating member, and the maintaining member to their normal positions in the absence of fluid pressure.

11. The combination of a railway vehicle axle, a normally inoperative steam booster motor adapted to drive said axle, a booster cylinder cock, means normally holding said cock in open position, means for disabling said holding means, and a manually controlled actuating device for said disabling means, said device being constructed and arranged so that the cylinder cock will always be open upon a discontinuance and subsequent reapplication of the booster driving power regardless of the position in which said manual actuating device may have been left by the operator.

12. The combination with the cylinder of a steam engine, of a cylinder cock, means normally holding said cock in open position irrespective of whether the cylinder is using steam or not, means for disabling said holding means, and a manually controlled actuating device for said disabling means, said device being constructed and arranged so that the cylinder cock will always be open upon a discontinuance and subsequent reapplication of the power of the steam engine regardless of the position in which said manual actuating means may have been left by the operator.

In testimony whereof, I have hereunto signed my name.

FRANK RICHARD PETERS.